Patented Feb. 18, 1947

2,415,890

UNITED STATES PATENT OFFICE 2,415,890

METHOD OF ISOMERIZING PARAFFIN HYDROCARBONS

Percival C. Keith, Peapack, N. J., assignor to The M. W. Kellogg Company, Jersey City, N. J., a corporation of Delaware No Drawing. Application November 29, 1941, Serial No. 420,967

7 Claims. (Cl. 260—683.5)

This invention relates to the catalytic isomerization of paraffin hydrocarbons (including cycloparaffin hydrocarbons). More particularly, the invention relates to the catalytic isomerization treatment of straight chain, or slightly branched-chain, paraffin hydrocarbons to effect conversion thereof to branched-chain, or more highly branched-chain, hydrocarbons.

The paraffin hydrocarbons which are treated in accordance with this invention generally include paraffin hydrocarbons having four or more carbon atoms per molecule. Individual hydrocarbons, such as normal butane, may be treated to effect the production of the corresponding isomer. Narrow-boiling fractions, such as the narrow-boiling normally liquid fraction generally designated as "refinery hexanes" may be treated to increase the proportion of branched-chain hydrocarbons contained therein. In addition to the treatment of individual hydrocarbons or or narrow-boiling fractions the process is applicable also to the treatment of mixtures of hydrocarbons containing constituents which are subject to the desired reaction. Such mixtures include relatively wide-boiling fractions, for example, light naphtha, heavy naphtha, or natural gasoline.

While the treatment of individual or mixed hydrocarbons may be for the purpose of producing individual isomers of such hydrocarbons, the relatively wide-boiling fractions ordinarily are treated in accordance with the present invention to improve their properties for use as gasoline motor fuel or as blending materials for use in combination with other gasoline constituents. The extent of the isomerization reaction resulting from the treatment of hydrocarbon fractions to improve their properties as motor fuel constituents is determined ordinarily by a comparison of the octane number of the product with that of the untreated material.

The catalysts employed in connection with this invention comprise the solid granular materials which are capable, at atmospheric pressure, of promoting the cracking of hydrocarbons at a substantial rate of temperatures between about 600° F. and high temperatures at which cracking proceeds at a substantial rate in the absence of catalysts. Such materials retain their granular form during the reaction and are not highly active in promoting cracking of low-boiling hydrocarbons at temperatures below about 600° F. These catalysts comprise naturally-occurring materials, which may have been treated to improve their catalytic properties, and materials prepared synthetically. Materials which are essentially silicon dioxide, such as diatomaceous earth and silica gel, may be employed, but the catalysts preferred for use in the process of the invention comprise an oxide of another metal, as well as the oxide of silicon. Such materials may be generally classified as metal silicates. Examples of such metal silicates are the naturally-occurring magnesium silicates and aluminum silicates and synthetic combinations of silicon dioxide with the oxides of magnesium and aluminum. The silica-alumina catalysts may be obtained in the form of clays, which may be acid treated to improve their catalytic properties, or may be prepared by the synthetic combination of the oxides. Other solid materials which may be employed include promoted alumina such as activated alumina or bauxite promoted with non-metallic oxide or acids, for example activated alumina with a minor proportion of boron oxide, silicon oxide, or hydrofluoric acid.

A particularly active form of catalyst for use in connection with the present invention is prepared by the activation of silica gel with aluminum oxide. This form of the catalyst may be prepared by simultaneous precipitation of the silica gel and aluminum hydroxide in the same aqueous solution, or a previously prepared silica gel may be activated by means of an aluminum salt solution, from which aluminum hydroxide is deposited on the silica gel by hydrolytic adsorption or by precipitation. An active catalyst also may be prepared by thoroughly homogenizing silica gel with alumina, the latter being preferably in the gel form. Combinations of these methods may be employed in a single preparation.

In carrying out the process of the invention the hydrocarbons are contacted with the catalyst under conditions of temperature and pressure at which cracking of the hydrocarbons is substantially minimized. The maximum temperature which may be employed, therefore, depends upon the susceptibility of the hydrocarbons under treatment to the cracking effect of the catalyst at the conditions employed. In the isomerization of butane the temperature employed should be not greater than about 800° F. although the optimum temperature for the production of isobutane from normal butane may be substantially lower. Generally, the maximum temperature to be employed in the isomerization of other and heavier molecular weight hydrocarbons is lower than 800° F. since the susceptibility of hydrocarbons to the cracking effect of the catalyst increases with increasing molecular weight. In general, the optimum temperatures for the isomerization of paraffin hydrocarbons in accordance with the process of this invention are within the range of 400° to 800° F.

The process of the invention is carried out under high superatmospheric pressure to promote formation of the isomers and minimize cracking. The pressure employed has some effect on the optimum temperature since the use of relatively high pressures permits the use of somewhat higher temperatures than could otherwise be employed without excessive cracking of the hydrocarbons under treatment. Preferably, the process is carried out at pressures of 2000 pounds per square inch or higher, for example, 5000 pounds per square inch.

Preferably the isomerization reaction is carried out under a substantial partial pressure of hydrogen. This assists in sustaining the activity of the catalyst and preventing formation and polymerization of olefin hydrocarbons.

The invention will be described further by reference to a specific example of the application of the process to the isomerization of normal butane. It should be understood, however, that the invention is not limited to the particular operating conditions employed in the example, the hydrocarbons treated or the catalyst used.

The catalyst employed was prepared by activating, with an aluminum salt solution, a previously prepared silica gel. The granular mass of substantially dry silica gel was covered with a .2 normal solution of aluminum sulfate. The mixture was heated to a temperature of 160° to 170° F. and maintained at that temperature for two hours with occasional agitation. At the end of this activating period the solution was poured off and the silica gel remaining was washed several times by decantation with distilled water. The final catalyst was dried at 220° F. for about 24 hours before use. The catalyst thus prepared contained approximately 1 weight per cent of $Al_2O_3$.

The catalyst material thus obtained was employed in the isomerization treatment of a gas mixture having the following composition:

| | Weight per cent |
|---|---|
| Propane | 4.7 |
| Butene | 0.5 |
| Normal butane | 76.0 |
| Isobutane | 15.8 |
| Heavier hydrocarbons | 3.0 |

This hydrocarbon mixture was passed over a granular mass of the catalyst at a space velocity (liquid basis) of approximately 0.1 volumes of hydrocarbons per hour per volume of catalyst space. The hydrocarbons were contacted with the catalyst at a temperature of approximately 500° F., and the reaction zone was maintained at a pressure of 5000 pounds per square inch. The product obtained had the following composition:

| | Weight per cent |
|---|---|
| Propane | 3.4 |
| Butene | 0.0 |
| Normal butane | 67.5 |
| Isobutane | 25.2 |
| Heavier hydrocarbons | 3.9 |

Comparison of the composition of the product of the above operation with that of the charge reveals that approximately 12 per cent of the normal butane of the charge was isomerized to isobutane. Except for condensation of the unsaturated hydrocarbons of the charge no undesirable side reactions were observed.

In the foregoing example of the process of the invention the hydrocarbons were passed over the catalyst at a liquid space velocity of approximately 0.1 volume of hydrocarbons per hour per volume of catalyst space. The extent of isomerization of the charge at any selected condition of temperature and pressure necessarily will vary with the space velocity, a low degree of conversion being associated with high space velocities and vice versa. The rate of reaction also is influenced by the temperature employed, although as the temperature is increased the effect of side reactions, such as cracking, is noticed. The operation is best conducted, therefore, at moderate temperatures and relatively low space velocity. In general it is necessary to maintain the space velocity not greater than 1 volume of liquid hydrocarbons per hour per volume of catalyst space. The minimum space velocity to be employed is largely a matter of choice depending upon the concentration of the isomers desired in the final product.

In the foregoing example the catalyst employed consisted predominantly of silica and contained not over 1 weight per cent of alumina. The use of a catalyst containing so small a proportion of alumina is not essential to the invention, however, since silica gel-alumina catalysts prepared by other methods such as co-precipitation of the silica gel and alumina, or homogenization, produce catalysts containing substantially greater proportions of alumina which are equally effective in carrying out the process of the invention.

The catalysts employed in the present process become deactivated gradually at a rate which depends upon the severity of the operating conditions employed by the deposition of carbonaceous materials thereon. It is desirable, therefore, to reactivate the catalyst periodically by the removal of such carbonaceous deposits. Reactivation can be effected advantageously by burning the carbonaceous deposits from the surfaces of the catalyst by the passage thereover of a gas containing oxygen. The process thus has the advantage over other isomerization processes in that the catalyst employed may be reactivated an indefinite number of times without loss of catalytic material.

The catalysts employed in the present process are used in the form of a stationary granular mass contained in a suitable reactor, in the form of a moving bed of granular material, or in the form of a fluidized body of more finely divided catalytic material. The stationary bed of catalytic material is regenerated periodically in situ. The activities of the moving bed of catalytic material and the fluidized body are maintained by the continuous or intermittent introduction therein of a small amount of fresh or regenerated catalytic material, regeneration being effected in a separate zone by the treatment of correspondingly small amounts of catalytic material continuously or intermittently removed from the moving bed or fluidized body.

I claim:

1. The method of isomerizing normal butane to isobutane which comprises contacting said normal butane with a silica-alumina catalyst as the essential catalyzing agent under a pressure greater than 2,000 pounds per square inch at a temperature substantially below 800° F. and at a space velocity lower than 1 volume of liquid butane per hour per volume of catalyst space.

2. The method of isomerizing normal butane to isobutane which comprises contacting said normal butane with a silica-alumina catalyst as the essential catalyzing agent under a pressure of about 5,000 pounds per square inch at a temperature substantially lower than 800° F. and at a space velocity lower than 1 volume of liquid butane per volume of catalyst space per hour.

3. The method of isomerizing normal butane to isobutane which comprises contacting said normal butane with a silica gel-alumina catalyst as the essential catalyzing agent under a pressure greater than 2,000 pounds per square inch at a temperature substantially lower than 800° F. and at a space velocity substantially lower than 1 volume of liquid butane per hour per volume of catalyst space.

4. The method for isomerizing paraffin hydrocarbons which comprises contacting said paraffin hydrocarbons with a silica-alumina catalyst as the essential catalyzing agent under superatmospheric pressure at a temperature substantially lower than 800° F. and at a space velocity substantially lower than 1 volume of liquid hydrocarbon per volume of catalyst space per hour and under a substantial partial pressure of hydrogen.

5. The method of isomerizing normal butane to isobutane which comprises contacting said normal butane with a silica-alumina catalyst as the essential catalyzing agent under a pressure greater than 2000 pounds per square inch, at a temperature substantially lower than 800° F., and at a space velocity not substantially greater than 0.1 volume of liquid butane per hour per volume of catalyst space.

6. The method of isomerizing normal butane to isobutane which comprises contacting said normal butane with a silica-alumina catalyst as the essential catalyzing agent under a pressure greater than 2000 pounds per square inch, at a temperature substantially not greater than 600° F., and at a space velocity not substantially greater than 0.1 volume of liquid butane per hour per volume of catalyst space.

7. The method of isomerizing paraffin hydrocarbons which comprises contacting said paraffin hydrocarbons with a silica-alumina catalyst as the essential catalyzing agent under a pressure substantially greater than 2000 pounds per square inch, at a temperature of approximately 400° to 600° F., and at a space velocity substantially less than one volume of liquid hydrocarbon per hour per volume of catalyst space.

PERCIVAL C. KEITH.

REFERENCES CITED

The following references are of record in the file of this patent:

UNITED STATES PATENTS

| Number | Name | Date |
| --- | --- | --- |
| 2,265,548 | Schuit (A) | Dec. 9, 1941 |
| 2,265,870 | Schuit (B) | Dec. 9, 1941 |
| 2,271,043 | Van Peski | Jan. 27, 1942 |
| 2,230,552 | Voorhies | Feb. 4, 1941 |
| 2,259,469 | Houdry | Oct. 21, 1941 |
| 2,222,400 | Butz | Nov. 19, 1940 |
| 2,217,252 | Hoog | Oct. 8, 1940 |
| 2,303,083 | Kuhl | Nov. 24, 1942 |
| 2,297,773 | Kanhofer | Oct. 6, 1942 |
| 2,266,011 | d'Ouville et al. I | Dec. 16, 1941 |
| 2,266,012 | d'Ouville et al. II | Dec. 16, 1941 |
| 2,291,376 | Cheney | July 28, 1942 |
| 2,304,168 | Heard | Dec. 8, 1942 |
| 2,308,792 | Thomas I | Jan. 19, 1943 |
| 2,324,762 | Calhoun et al | July 20, 1943 |
| 2,328,756 | Thomas II | Sept. 7, 1943 |
| 2,337,418 | Ruthruff | Dec. 21, 1943 |
| 2,208,362 | Engel | July 16, 1940 |